May 2, 1967  H. H. HERRIN  3,317,176
APPARATUS FOR STORING AND RETRIEVING INFORMATION
Filed Oct. 14, 1965  3 Sheets-Sheet 3
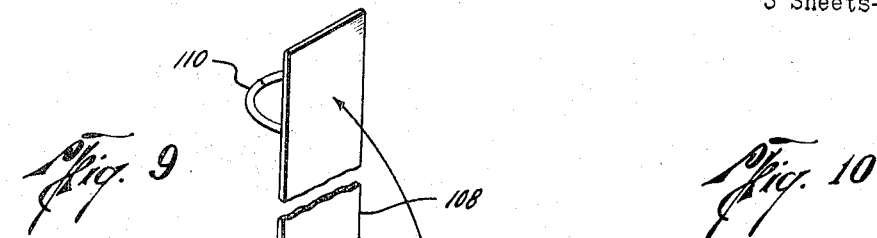
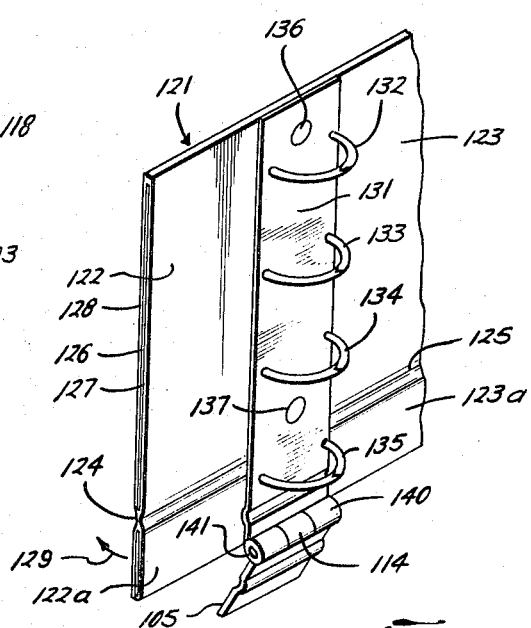
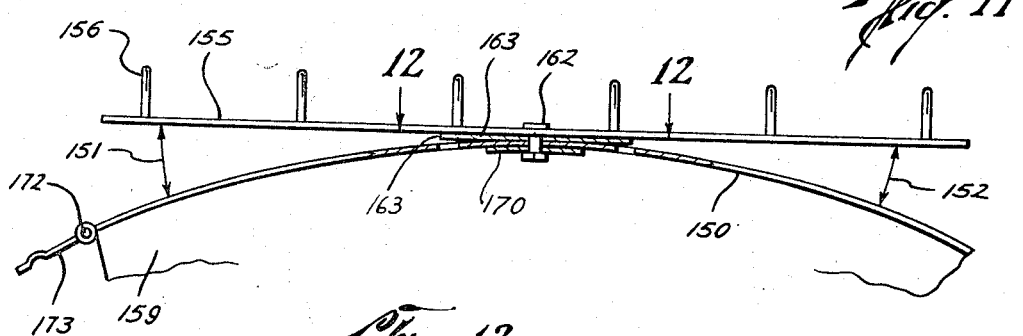
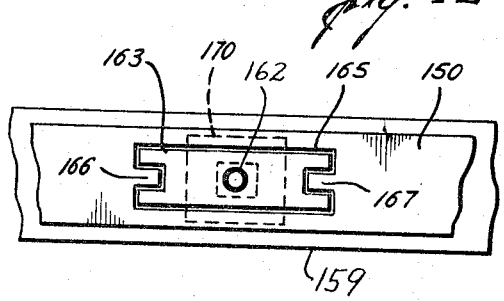
Harold H. Herrin
INVENTOR.
BY Carl B. Fox, Jr.
ATTORNEY

United States Patent Office 3,317,176
Patented May 2, 1967

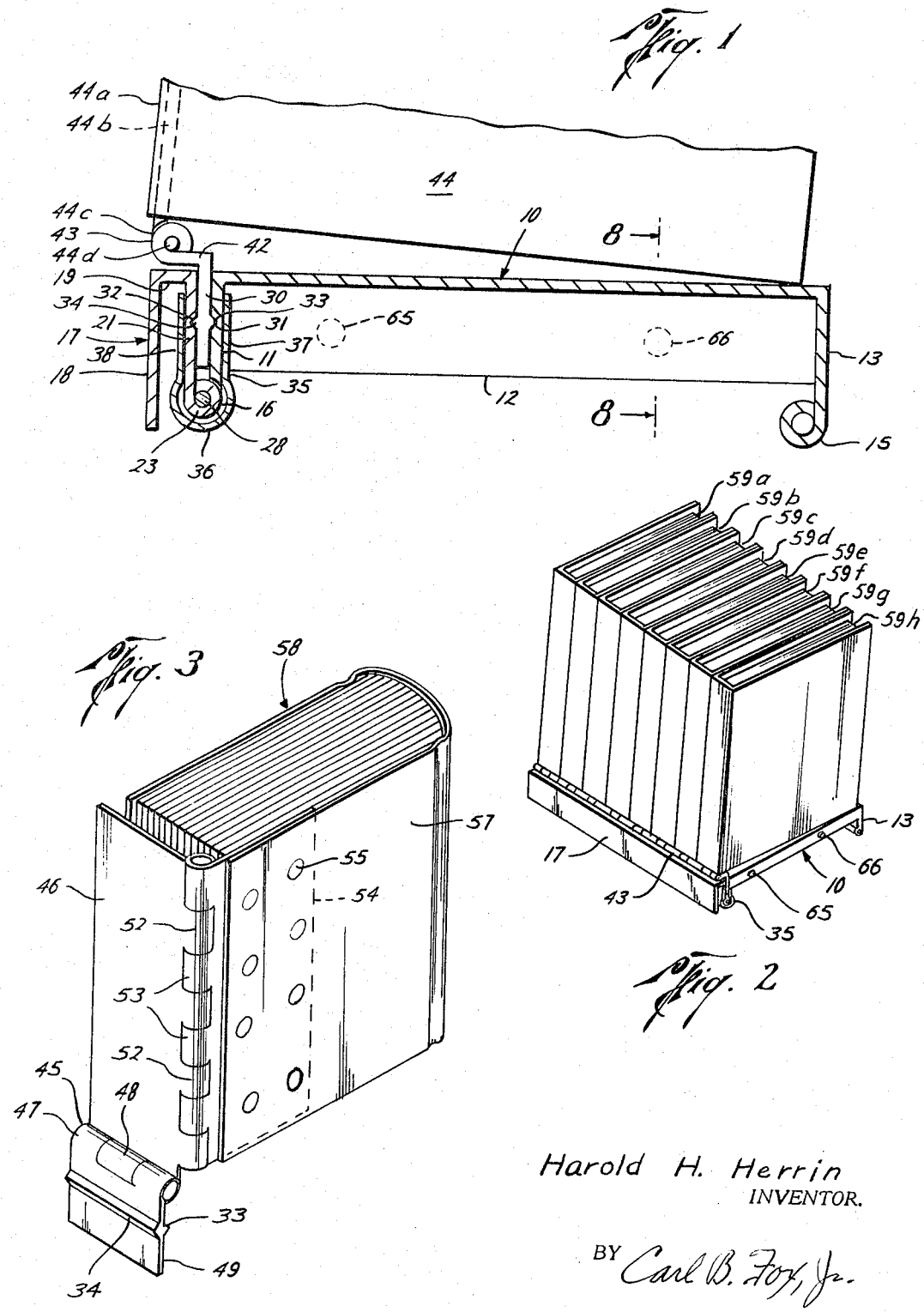

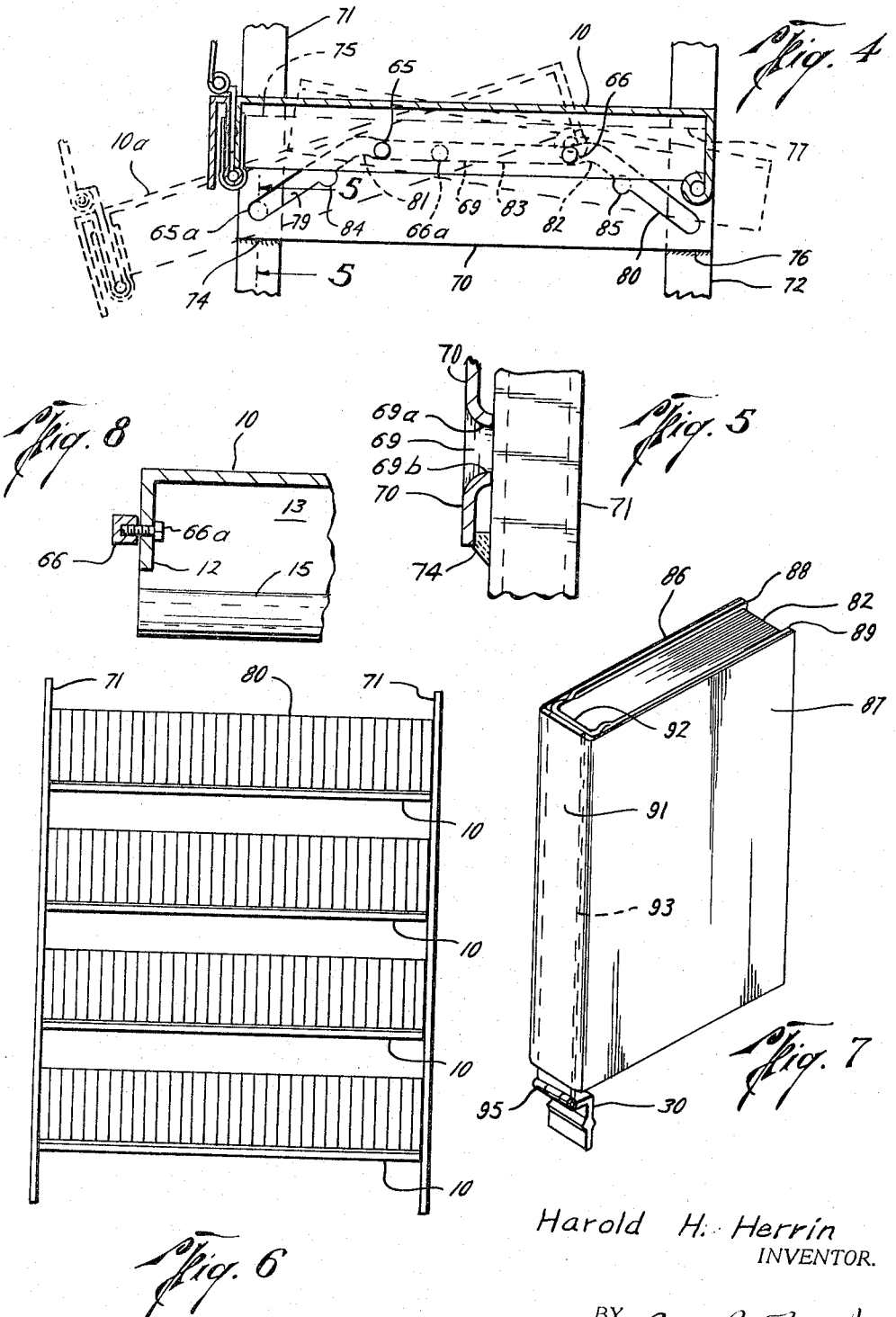

3,317,176
APPARATUS FOR STORING AND RETRIEVING
INFORMATION
Harold H. Herrin, 4704 Edison St.,
Houston, Tex. 77009
Filed Oct. 14, 1965, Ser. No. 496,058
17 Claims. (Cl. 248—447)

This application is a continuation-in-part of application Ser. No. 489,356, filed September 22, 1965, by the same applicant, and entitled, "Apparatus for Storing and Retrieving Information."

This invention pertains to apparatus for storage of printed information, and also to methods for use of such apparatus.

A primary object of this invention is to provide apparatus for storage of printed information, in book form, whereby the information contained in the books is readily available for use. The books may be of any form, looseleaf, bound, or the like.

An additional object of this invention is to provide such apparatus which is convenient, economical, adaptable, and which is dependable and of good appearance.

An additional object of the invention is to provide such apparatus which is adaptable to containing information in books of any size (or thickness) the books containing such information being readily removable and replaceable from the apparatus.

Briefly, the invention contemplates systems for storage of printed information in book form. The books are adapted at their hinged sides, or backs, for reception into a locking mechanism whereby the books may be moved to positions for inspection or reading. By use of the apparatus and methods afforded by the invention, information in printed or written form may be stored efficiently and in arrangements handy for use. The apparatus may be adapted for support upon a desk or table, or the like, or may be made in bookcase form supported upon a floor, or the like. The apparatus is such that individual volumes of the information may be removed from the shelf or rack and taken elsewhere for use, of the volumes may be independently individually used without such removal, by moving them to accessible positions adjacent to the shelf or rack upon which same are supported.

Other objects and advantages of the invention will appear from the following detailed description of preferred embodiments thereof, reference being made to the accompanying drawings, of which:

FIG. 1 is a vertical cross-sectional view through a single shelf provided according to the invention, same being of preferred form, and showing in addition one volume or book of a plurality of volumes or books supported upon the shelf;

FIG. 2 is a perspective view, showing the shelf of FIG. 1 in vertical section, showing only a portion of the length of the shelf, there being a plurality of books or volumes shown connected to the shelf in the manner of the invention;

FIG. 3 is a perspective view showing a modified form of apparatus according to the invention;

FIG. 4 is a vertical cross-sectional view showing a manner of providing a tilting shelf according to the invention;

FIG. 5 is a vertical cross-sectional view taken at line 5 of FIG. 4;

FIG. 6 is an elevational view showing a set of bookshelves according to the invention;

FIG. 7 shows a further modified form of apparatus according to the invention;

FIG. 8 is a partial vertical cross section taken at line 8—8 of FIG. 1;

FIG. 9 is a perspective view of a portion of a looseleaf ring binder including an arrangement incorporating a book-connecting tab according to the invention;

FIG. 10 is a perspective view of a portion of a modified form of a looseleaf ring binder including another arrangement incorporating a book-connecting tab according to the invention;

FIG. 11 is a vertical cross-sectional view through another modified looseleaf ring binder wherein the ringed member is pivotally-connected for inversion of the ringed member and sheets of paper bound therein; and FIG. 12 is a partial horizontal cross-sectional view taken at line 12—12 of FIG. 11.

Referring now to the drawings in detail, and first to FIGS. 1 and 2 of the drawings, a flat horizontal metal shelf 10 has downturned flanges therearound, indicated by the reference numerals 11, 12, 13, the downturned flange at the end of the shelf opposite flange 12 not being shown in the drawings but being a mirror image of flange 12. Flange 13 terminates downwardly in a curvate circular formation 15, which may be adapted for support of the rear or back side of the shelf by a pin (not shown) inserted through the circular formation and introduced or disposed into a pin receptacle at each end of the shelf, thereby providing firm support for the shelf.

At the front side of the shelf, downturned flange 11 is formed at its lower edge into an outwardly depending serrated hinge half 16. Flanges 11, 13 extend downwardly to below the lower edges of the flange 12 and the mirror-image flange at the end of the shelf opposite flange 12. A shelf front member 17, has a frontal web extending downwardly from the level of shelf 10 to cover or shroud the shelf, has a shelf portion 19 which cooperates with shelf 10 to form the complete shelf, and has a downwardly turned portion 21 which complements flange 11 and has at its lower end a hinge half 23 which is serrated at its lower edge similarly and complementary to formation 16 in a series of inwardly curvate half hinge elements, these intermeshing with and between the similar elements of hinge half 16 at the lower end of flange 11. A pin 26 is engaged through the intermeshed curvate hinge formations 23, 16 to hold them together and to provide pivotal motion of element 17 with respect to flange 11 and shelf 10. In other words, element 17 may be moved arcuately outwardly and downwardly from its position as shown in FIG. 1 to cause opening of the space between flange portions 11, 21.

A downwardly extending web 30 is disposed between flanges 11, 21. Flanges 11, 21 each have longitudinal slots or grooves 31, 32 to receive, respectively, ridges 33, 34 formed along the opposite longitudinal faces of web 30. An elongate spring member 35 has lower circular spring portion 36 and biased together face portions 37, 38 which press against the outer sides of flanges 21, 11. This spring element 35 causes element 30 to be held under pressure between flanges 11, 21 and thereby to be held therebetween securely. Grooves and ridges 31, 32, 33, and 34 may be omitted if desired, and friction between the faces allowed to hold web 30 in place, but it is preferred that the ridges and grooves, or other friction-increasing means be provided in order that the securing of web 30 between flanges 11, 21 will be more reliable.

At its upper end, web 42 is upwardly formed into a serrated half hinge formation (also shown in FIG. 2) indicated by reference numeral 43. The book 44 has made into its back or hinge side 44a a plate or strip 44b the lower end of which extends below the corner of the book and is formed into a serrated half hinge formation 44c which is intermeshed with similar formation 43, these being held together as a complete hinge by pin 44d. Book 44 may be pivotally removed to a position outwardly extending from shelf 10 for reading, and may then be rotated back onto the shelf. Other books and adjacent books on the shelf do not interfere with these movements and use of book 44. When it is rotated from the shelf, book 44 may be opened freely for reading or other use. The other books (not shown) on the shelf may be used similarly. Spring 36 and hinge 11, 21 may be forced open to remove any book on the shelf independently, by withdrawing the web 30 from the hinge.

Referring now to FIG. 3 of the drawings, there is shown a hinge 45 the upper leaf portion 46 of which is connected by a serrated half hinge formation 47 to serrated half hinge formation 48 at the upper end of web 49. Tab or web element 49 is of the same form as web 30 shown in FIG. 1, except that horizontal portion 42 is omitted. Web 49 has ridges 32, 33 thereacross which are adapted to be disposed in grooves 31, 32 of hinge 11, 21 in the same manner as is web 30 disposed therein.

Along the length of one vertical side of web 46, there is formed a plurality of serrated half hinge formations 52 at which are alternately disposed between similar formation 53 at the edge of a plate or web 54 to form a hinge. Plate or web 54, like the other apparatus elements heretofore described, may be made of sheet metal or plate, or may be of plastic or any other suitable material, either rigid or flexible. A plurality of rivets 55 secure plate 54 inside the edge of cover 57 of book 58 as shown. It will be understood that, when tab or web portion 49 is secured within a hinge assembly such as that provided by flanges 11, 21 of FIG. 1, that book 58 may be pivotally moved with hinge web to a position to the left hand side of web 49 and the hinge holding the web. Then, the book may be rotated to the right about the pivotal axis or hinge 52, 53 and opened for any use of its contents. The book when so moved is away from the other volumes such as the plurality of volumes shown in FIG. 2 so as to be unhindered upon opening and reading, and may be removed from the shelf by opening the hinge holding the tab, as has been described.

The plurality of books 59a through 59h are arranged side-by-side upon the shelf 10 shown in FIG. 2. It will be apparent that shelf 10 may be supported upon any flat surface, such as a table or a desk, or may be supported by other convenient means, such as posts or panels, for example.

Any book or a plurality of books, such as books 59a–59h, supported upon a self 10 supported in any of the manners described, may be moved outwardly from the shelf about the hinge pivot at the front of the shelf in order to be opened, either in the manner of FIG. 1 or the manner of FIG. 3.

Referring now to FIG. 4 of the drawings, and still to FIGS. 1 and 2, the ends of the shelf 10 each have thereon, at the end flange 12 and the similar flange at the opposite end of the shelf, a pair of pins 65, 66. These pins, which may alternatively be rollers, extend from the shelf ends and are disposed moveable within longitudinally curvate groove or slots 69 in shelf end plates 70 (only one being shown in FIG. 4), the plate 70 being welded to shelf posts 71, 72 at welds 74, 75, 76, 77. The plate 70 may be secured to the posts 71, 72 or other supports, in any other suitable manner. As shown in FIG. 4 the slot 69 is angularly downturned at its ends 79, 80. Slot 69 has upward humps 81, 82 at the ends of its horizontal portion 83. A pair of downwardly formed semicircular recesses 84, 85 are formed intermediate the lengths of slot portions 79, 80. When shelf 10 is moved in one direction, to the left as the shelf 10 is pictured in FIG. 4, the pins (or rollers) 65, 66 are moved to positions 65a, 66a and the shelf 10 is moved to angular position 10a as shown in FIG. 4. The shelf can also be moved toward the left so that pin 65 comes to rest in notch 84. In this position, the shelf is at a shallower angle and is not extended beyond post 71 to the extent shown by shelf position 10a. The shelf may be moved in the other direction, toward the right as the shelf is pictured in FIG. 4, and pin 66 may be placed in notch 85 or at the lower end of slot portion 80. Any number of recesses 84, 85 may be disposed along the lengths of slot portions 79, 80 so that any number of angular positions of the shelf may be realized. Notches may be substituted for the humps 81, 82. Of course, when the shelf is supported as shown in FIG. 4, there is no pin within circular formation 15 engaged with a post of other support for the shelf.

Referring to FIG. 5 of the drawings, the form of slot 69 is shown to be outturned or upset along the slot edges 69a, 69b toward the shelf 10 at each end of the shelf (although only one plate 70 is pictured in FIG. 5). The slot 69 may be formed to be entirely coplanar with plate 70 without inturned edges 69a, 69b, or may be of other desired form. When rollers are provided instead of the pins 65, 66, the friction of movement of the shelf is, of course, reduced and easier movement of the shelf would be expected.

Referrring now to FIG. 6 of the drawing, there are shown two posts 21 at opposite ends of a plurality (four being shown) of shelves 10, each supported at their ends by the post 71 and the rearward post 72 which are not shown in FIG. 6. The plate 70 for each shelf are disposed and fastened in place between posts 71, 72 at each end of the shelves, and the shelves, having pins 65, 66 (or rollers) are supported as has been indicated. Each shelf, therefore, would be independently moveable forward or rearward to one or more angular positions with the pins 65, 66 (or rollers) moving in the slots as indicated in connection with FIG. 4. The number of shelves 10 in any such arrangement shown in FIG. 6 may be of any suitable number and the shelves may be of any suitable lengths. Each book or volume 80 shown arranged along one of the shelves 10 of FIG. 6 may be supported thereon in any of the manners described, including the manner of FIG. 7 to be described. The shelves may be removed from the bookcase of FIG. 6 by removing the pins 65, 66 from either or both ends of the shelf. This is shown in FIG. 8 of the drawings, wherein the pin 66 is shown to be connected to the flange 12 and the opposite end flange by a screw 66a disposed through a suitable perforation in the flange. By unscrewing the screw, each pin (or roller) is removed so that the shelf may be carried, with the books thereon, to another location, such as upon a desk, or installed in another support, for use, and may be re-installed in the bookcase at a later time if desired.

Referring now to FIG. 7 of the drawings, a book 82 is shown having a pair of opposite fabric or plastic flaps or leaves 86, 87 bonded or glued or otherwise suitably affixed to the outer sides of the covers 88, 89 of the book. Flaps 86, 87 may extend all the way across 88, 89 as shown, or only part way. A back portion 91 disposed and connected between leaves 86, 87 covers the back 92 of book 82. A strip 93 between overlapped strips of cloth or plastic sheeting extending between leaves 86, 87 or by bonding or otherwise fastening strip 93 to the inside of back portion 91. The lower end of strip 93 is in the form of a serrated half hinge formation 95 which is adapted to intermesh with a similarly formed half hinge member of web 30 or 49 as is shown in FIGS. 1 and 3. Therefore, book 82 may be set upon and connected to a shelf 10 as has previously been described, and may be moved frontally arcuately from the shelf for reading.

Each book or volume supported upon a shelf 10 in the various manners described may be removed from the shelf by opening of the hinge flaps formed by webs 11, 21 by either pulling on the book sufficiently to open the hinge against the pressure of the spring 36 or by inserting a wedge device into the hinge in order to pry it open, or other suitable manners. Therefore, a book may be removed from the shelf completely in order to be taken elsewhere and used.

In FIG. 9 of the drawings, there is shown a looseleaf ring binder 101 only the innermost portions of the cover members 102, 103 being shown in the drawing. The hinge back of the notebook 104 has at its upper end a half hinge formation 105 of the type previously described to which is secured by pin 106 the half hinge 107 of ringed member 108, which is of elongate form of the same width as hinge member 104. The loops or rings 110, 111 are carried on the face of member 108 and are adapted to open at their outermost center portions as is conventional. Paper-bearing perforations may be slipped onto the rings after which the rings are closed to hold the paper in place. At its lower end hinge 104 has half hinge formation 112 to which is secured by pin 113 half hinge 114 of book connecting tab 115 of the form previously described in connection with FIG. 3. Tab 115 may be rotated to be flushly against hinge 104 as indicated by arrow 116. Then, with tab 115 in the position against hinge 104, member 108 may be rotated to overlie tab 115. Thus, the tab is removed from sight and is out of the way for handling of the book when the book is not to be connected upon a shelf as has been described. The fact that member 108, carrying the rings 110, 111 is loosely mounted within the notebook does not detract from the utility of the notebook since the weight of the paper and the member 108 will hold it in place against hinge member 104 when the book is used. If it is desired to again mount the book 101 upon a shelf as has been described, then member 108 is raised and tab 115 moved again to extended position. Arrow 118 indicates the movement of member 108. There may be any number of rings or loops 110, 111 as desired.

In FIG. 10 of the drawings, there is shown a looseleaf ring binder notebook 121 of which, again, the cover members 122, 123 are shown only portionally. At their lower ends, cover portions 122, 123 have hinged portions 122a, 123a. The hinges provided at 124, 125 are formed by bonding the plastic covering 126, 127 together along a line extending between filler portions 128 held between the two sheets of plastic. The plastic is additionally bonded together around the edges of the covers of the note book. Thus, cover portions 122a, 123a may be moved in the direction indicated by arrow 129 so that the tab element 115 may be pivotally moved about its half hinge 114 to be beneath an end of ringed hinge portion 131. Hinge member 131 has rings 132–135 which are adapted to open to receive perforated paper, as is conventional. Member 131 is secured to the portion of the book cover between the opposite covers 122, 123 by a pair of rivets 136, 137. When it is desired to move tab member 115 to extended position as shown in FIG. 10, then the cover portions 122a, 123a are backbent in the direction of arrow 129 so that tab 115 may be rotated to the desired position. Then, when the book is removed from the shelf for a period of time and it is desired to move tab 115 to a position which is out of the way and will not hinder use, then cover portions 122a, 123a are again backbent and tab 115 rotated or pivotally moved to behind the lower end of member 131, after which the covers may be straightened and the book used as desired.

Still referring to FIG. 10, member 131 has at its lower end a half hinge 140 which is secured by pin 141 to half hinge 114 of book connecting tab 115.

Referring now to FIG. 11 of the drawings, the spine or hinge 150 of a looseleaf ring binder notebook is shown backbent downwardly at arows 151, 152 away from the oposite ends of ringed member 155. Member 155 has a plurality of rings or loops 156 which are adapted to open for reception or removal of perforated notebook paper or similar sheets. Member 150 has hingedly secured along each of its edges a cover 159, only one being shown. The other cover is disposed oppositely in the same manner at the opposite edge of member 150. Member 155 has a perforation at its longitudinal center through which is disposed a rivet 162. Rivet 162 extends through a shaped plate 163, better shown in FIG. 12, which is fixedly disposed against the underside of member 155. Member 150 has an opening 165 therethrough which conforms to the shape of the outline of plate 163, having the interlocking end portions 166, 167 projecting members 166, 167 are received into corresponding end slots of plate 163 so that member 150 cannot rotate with respect to plate 163. When the member 150 is bent as shown in FIG. 11, then the members 166, 167 are removed downwardly from the end slots of plate 163 so that the binder carrying member 155 may be rotated with respect to the spine of the book and with respect to the covers secured to the spine.

The rivet 162 extends through member 155 through plate 163, and through the opening 165 of member 150. A washer, shown of square shape, and identified by reference numeral 170 holds the center portion of spine 150 securely in place against member 155. The spine 150 of the notebook shown in FIGURES 11 and 12 has at one end, connected by hinge 172 a book-connecting tab 173 of the form previously described in connection with the other figures. Therefore, the purpose of the notebook shown in FIGURES 11 and 12 is so that the contents of the book, together with ring-carrying member 155 may be rotated with respect to the covers if this should be desired.

While preferred embodiments of the invention have been shown and described herein, many modifications thereof may be made by a person skilled in the art without departing from the spirit of the invention, and it is intended to protect by Letters Patent all forms of the invention falling within the scope of the following claims.

I claim:

1. Apparatus for storing and retrieving information disposed on the sheets of books, and the like, comprising substantially horizontal support surface means having at least one substantially straight longitudinal side portion, clamp means disposed along said side portion adapted to frictionally engage downwardly extending web means therein and to open for release of said web means, at least one hinge means having downwardly extending web means frictionally and releasably engaged in said clamp means and having book connection means pivotally connected to the upper end of said web means and secured to the back hinge portion of a book.

2. Combination of claim 1, said clamp means comprising downwardly extending flange means from said support surface means and downwardly extending web means parallel outwardly therefrom and hinge means connecting the lower edges of said flange means and said web means, and spring means disposed about said hinge means biasing said flange means and said web means one toward the other.

3. Combination of claim 1, said book connection means comprising strip means made into the spine portion of a book.

4. Combination of claim 1, said book connection means comprising a book spine portion and web portions extending oppositely therefrom affixed to the outer surfaces of the front and back covers of the book.

5. Combination of claim 1, said book connection means comprising a book spine portion and a web means hinged to one side of said book spine portion fixed to a cover portion of the book.

6. Combination of claim 1, said substantially horizontal support surface means comprising a horizontal shelf web means having downturned flange means therearound at its ends and sides, the frontal side flange means thereof being formed at its lower end into a half hinge, web means parallel with said frontal flange means also formed at its lower end into a half hinge, pin means engaging each said half hinge means together to form a hinge upwardly, hinged web means frictionally engaged between said frontal flange means and said web means and connected with the spine portion of a book upwardly of the hinge thereof, whereby said book may be arcuately revolved about the hinge of said upwardly hinged web means to and from support upon said horizontal shelf web means.

7. Combination of claim 6, said upwardly hinged web means being made at its upper end above said hinge into the spine portion of a book.

8. Combination of claim 7, said upwardly hinged web means including web means above said hinge upset frontally of said horizontal shelf web means.

9. Combination of claim 7, said upwardly hinged web means having vertical web means above said hinge made into the spine portion of a book.

10. Combination of claim 6, said end flange means of said horizontal shelf web means having a pair of spaced outwardly protruding means thereon, supported slotted means at each end of said horizontal shelf web means, the slots of each said supported slotted means having a horizontal midsection and downwardly and oppositely outwardly inclined end sections, said protruding means of said shelf web means.

11. Book apparatus, including a spine portion including page affixing means and cover portions oppositely disposed from said spine portion, said spine portion comprising first strip means having second strip means hingedly connected at one of its ends adapted for pivotal movement against said first strip means and away therefrom, said first strip means also having connecting tab means hingedly connected at the other of its ends and pivotally movable to against said first strip means and away therefrom, said second strip means having said page affixing means therealong at its side opposite its side movable against said first strip means, said connecting tab means when moved against said first strip means being covered by said second strip means also moved against said first strip means.

12. Combination of claim 11, said page affixing means comprising a plurality of spaced releasable binder rings.

13. Book apparatus, including spine strip means having page affixing means along one of its faces and having connecting tab means hingedly connected at one of its ends adapted for pivotal movement against the other of its faces and away therefrom, cover means affixed to said spine strip means having an edge portion pivotally movable away from said spine strip means covering said connecting tab means moved to against said spine strip means, whereby said edge portion of said cover may be pivotally moved outwardly from said spine strip means to permit movement of said connecting tab means from therebeneath, and vice versa.

14. Combination of claim 13, said page affixing means comprising a plurality of spaced releasable binder rings.

15. Book apparatus, comprising at least somewhat flexible spine strip means having cover means extending from along its opposite edges, substantially rigid strip means having page affixing means along one of its faces and being connected at its center against the center of said spine strip means for pivotal movements therebetween first interlock means on said spine strip means and second interlock means on said substantially rigid strip means mutually engaged when said strip means are in either of their mutually parallel positions and said spine strip means is unflexed and unengaged in other relative positions of said strip means, whereby said interlock means are released to permit mutual rotations between said strip means when said spine strip means is flexed.

16. Combination of claim 15, including connecting tab means hingedly carried at an end of said spine strip means.

17. Combination of claim 15, said page affixing means comprising a plurality of spaced releasable binder rings.

No references cited.

CHANCELLOR E. HARRIS, *Primary Examiner.*

JOHN PETO, *Examiner.*